United States Patent Office 2,997,502
Patented Aug. 22, 1961

2,997,502
BROMINATION OF SALICYLANILIDE
Guy C. Mattson, Midland, Mich., assignor to The Dow Chemical Company, Midland, Mich., a corporation of Delaware
No Drawing. Filed June 22, 1959, Ser. No. 821,621
6 Claims. (Cl. 260—559)

This invention relates to a novel process of brominating salicylanilide. More particularly, this invention involves the bromination of salicylanilide in an alcohol media to produce 3,4',5-tribromosalicylanilide.

Conventional methods of preparing tribromosalicylanilide involve bromination in such media as acetic acid, halogenated hydrocarbons, carbon disulfide and water. However, these conventional methods are expensive, do not produce a high grade tribromosalicylanilide, or produce a product requiring additional treatment. In contrast, the present invention, using an alcohol media, provides a method of preparing tribromosalicylanilide that is inexpensive, provides a better solvent media for salicylanilide, does not require costly equipment, eliminates hydrogen bromide decontamination procedures and produces a purer grade of tribromosalicylanilide.

An illustrative procedure consists of dissolving salicylanilide in an alcohol media, adding bromine to the solution at a temperature ranging from 30° C. to below that temperature at which substantial solvent losses occur, and separating the tribromosalicylanilide, such as by distillation.

The alcohol solvents to be employed in accordance with my invention are aliphatic alcohols. However, the high-molecular aliphatic alcohols, although operable, produce a reaction mixture which is difficult to submit to separation procedures. Optimum results are obtained with the simple unsubstituted aliphatic alcohols containing from one to four carbon atoms such as methyl alcohol, ethyl alcohol, the propyl alcohols and the butyl alcohols.

Various experiments run varying the concentration of solvent medium from 50 percent aqueous alcohol to absolute alcohol revealed no substantial variation in results. The amount of solvent medium employed merely affects the overall bromination time with low amounts of solvent giving a slurry that is difficult to agitate.

The temperature range found effective for the bromination varies from 30° C. to below that temperature at which substantial solvent losses occur. With ethyl alcohol, a temperature range of from about 30° C. to about 75° C. is preferred to obtain optimum results.

Variations in the amount of bromine employed produced variations in the ratio of tribromosalicylanilide to dibromosalicylanilide produced as illustrated by the following table:

| Equivalents Br$_2$/mole of Salicylanilide | Percent | |
|---|---|---|
| | Dibromo-Salicylanilide | Tribromo-Salicylanilide |
| 2.844 | 23 | 77 |
| 2.984 | 18 | 82 |
| 3.062 | 15 | 85 |

Thus, the preferred ratio of bromine to salicylanilide is of the order of 2.7 to 3.2 moles of bromine to each mole of salicylanilide.

The reaction time employed for the bromination can vary widely from one-half hour to six hours with substantially no variation in yield. Holding the reaction mixture at the reaction temperature for any appreciable length of time does produce a tribromosalicylanilide of a better color and thus suggestive of a higher grade of purity.

If the tribromosalicyanilide does not crystallize out of the reaction mixture, the tribromosalicylanilide can then be separated by crystallization on cooling the reaction mixture and removal of the solvent, if necessary.

The following example is given to illustrate the invention but is not to be construed as limiting the invention thereto.

*Example*

The reactor consisted of one-liter flask equipped with a stirrer, reflux condenser and addition funnel.

A charge of 85.4 grams of salicylanilide and 200 grams of 92 percent ethyl alcohol was placed in the reactor. The charge was heated to a temperature of 55° C. and constantly agitated. Bromine was added dropwise at a rate sufficient to maintain the temperature in a range from about 55° C. to about 65° C. After the addition was complete, the temperature was raised to 70° C. for a 45 minute time period. The reaction mixture was then cooled to 20° C. and filtered under vacuum. After removing the mother liquor, the reaction product was washed with water. The product is then oven-dried at 65° C. for a time period of from 18 to 24 hours.

The tribromosalicylanilide produced was of a white or colorless nature, of a fine crystalline size passing through a 200 mesh sieve and, as such, is readily usable in this form.

In addition to the ethyl alcohol specifically shown methyl alcohol, the propyl alcohols and the butyl alcohols may be substituted with the same or substantially similar results.

When the above procedure was repeated using acetic acid-water solvent media, the solvent did not dissolve the salicylanilide as readily as the solvent employed in the present application, the apparatus had to be equipped with a hydrogen bromide scrubber, and the tribromosalicylanilide produced was of a poor color and of a large particle size requiring further treatment.

Various modifications may be made in the present invention without departing from the spirit and scope thereof and it is to be understood that I limit myself only as defined in the appended claims.

I claim:

1. A process of preparing 3,4',5-tribromosalicylanilide which comprises reacting bromine with salicylanilide dissolved in an alkanol containing from one to four carbon atoms, and separating 3,4',5-tribromosalicylanilide from the reaction mixture.

2. A process of preparing 3,4',5-tribromosalicylanilide which comprises reacting bromine with salicylanilide dissolved in an alkanol containing from one to four carbon atoms at a temperature ranging from 30° C. to below that temperature at which substantial solvent losses occur, and separating 3,4',5-tribromosalicylanilide from the reaction mixture.

3. A process of preparing 3,4',5-tribromosalicylanilide which comprises reacting bromine with salicylanilide dissolved in ethyl alcohol at a temperature ranging from about 30° C. to about 75° C., and separating 3,4',5-tribromosalicylanilide from the reaction mixture.

4. A process of preparing 3,4',5-tribromosalicylanilide which comprises reacting bromine with salicylanilide dissolved in ethyl alcohol at a temperature of 55° C., and separating 3,4',5-tribromosalicylanilide from the reaction mixture.

5. A process of preparing 3,4',5-tribromosalicylanilide which comprises reacting bromine with salicylanilide dissolved in 92 percent aqueous ethyl alcohol at a temperature ranging from about 30° C. to about 75° C., and separating 3,4′,5-tribromosalicylanilide from the reaction mixture.

6. A process of preparing 3,4′,5-tribromosalicylanilide which comprises reacting bromine with salicylanilide dissolved in 92 percent aqueous ethyl alcohol at a temperature of 55° C., and separating 3,4′,5-tribromosalicylanilide from the reaction mixture.

References Cited in the file of this patent
UNITED STATES PATENTS 2,802,029     Schuler _____ Aug. 6, 1947

OTHER REFERENCES

Jadhav et al.: J. Ind. Chem. Soc., vol. 29 (1952), pp. 234–7.